US012734589B2

(12) United States Patent
Chang

(10) Patent No.: US 12,734,589 B2
(45) Date of Patent: Sep. 15, 2026

(54) POCKET HOLE DRILLING DEVICE

(71) Applicant: Pin-Feng Chang, Taichung City (TW)

(72) Inventor: Pin-Feng Chang, Taichung City (TW)

( * ) Notice: Subject to any disclaimer, the term of this patent is extended or adjusted under 35 U.S.C. 154(b) by 216 days.

(21) Appl. No.: 18/898,330

(22) Filed: Sep. 26, 2024

(65) Prior Publication Data

US 2025/0367738 A1 Dec. 4, 2025

(30) Foreign Application Priority Data

May 29, 2024 (TW) ................................ 113205542

(51) Int. Cl.
*B23B 47/28* (2006.01)
*B23B 49/00* (2006.01)
*B23B 51/00* (2006.01)

(52) U.S. Cl.
CPC .......... *B23B 47/287* (2013.01); *B23B 49/006* (2013.01); *B23B 47/28* (2013.01); *B23B 51/0054* (2013.01); *B23B 2247/00* (2013.01); *B23B 2247/10* (2013.01); *B23B 2260/004* (2013.01); *B23B 2260/128* (2013.01); *Y10T 29/5107* (2015.01)

(58) Field of Classification Search
CPC ..... B23B 47/28; B23B 47/287; B23B 49/006; B23B 51/0054; B23B 2247/00; B23B 2247/10; B23B 2260/004; B23B 2260/128; Y10T 29/5107
See application file for complete search history.

(56) References Cited

U.S. PATENT DOCUMENTS 4,603,719 A * 8/1986 Durney .................... B27M 1/08 409/199
4,631,799 A * 12/1986 Campbell ................. B27F 5/12 408/1 R
5,553,645 A * 9/1996 Durney ..................... B27C 9/04 409/199
7,229,342 B1 * 6/2007 York ........................ B28D 1/18 125/35
7,374,373 B1 * 5/2008 Park ........................ B23B 47/28 408/46
7,641,424 B1 * 1/2010 Sommerfeld ............. B27C 3/02 408/99
11,045,970 B1 * 6/2021 Durney ............... B23B 51/0054
2010/0054877 A1 * 3/2010 Buttrick, Jr. ............ B23B 47/28 408/1 R
2019/0030619 A1 * 1/2019 Thackery ............. B23B 47/287

FOREIGN PATENT DOCUMENTS

EP 2179809 A1 * 4/2010 .......... B23B 47/287

* cited by examiner

*Primary Examiner* — Jermie E Cozart
(74) *Attorney, Agent, or Firm* — HSML P.C.

(57) ABSTRACT

A pocket hole drilling device includes a rack, a front sensing switch, a rear sensing switch, a buffer unit, a rotary frame, a drilling unit, and a routing unit. The front sensing switch is mounted to the rack. The rear sensing switch is mounted to the rack, and is located at one side of the front sensing switch along a front-rear direction. The buffer unit is mounted to the rack. The rotary frame is rotatably connected to the rack and is rotatable between a first position and a second position. The drilling unit and the routing unit are mounted to the rotary frame. The front sensing switch outputs a front limit stop signal when the rotary frame is in the first position. The rear sensing switch outputs a rear limit stop signal when the rotary frame is in the second position. The buffer unit buffers rotation of the rotary frame.

9 Claims, 7 Drawing Sheets

POCKET HOLE DRILLING DEVICE

CROSS-REFERENCE TO RELATED APPLICATION

This application claims priority to Taiwanese Utility Model Patent Application No. 113205542, filed on May 29, 2024, the entire disclosure of which is incorporated by reference herein.

FIELD

The present disclosure relates to a pocket hole drilling device, and more particularly to a pocket hole drilling device with a precise return function.

BACKGROUND

Generally speaking, in order to fixedly interconnect two engagement members by a fastener (e.g., a wood screw), one of the engagement members has to be machined to have a groove and a bore that communicates with the groove, and then the fastener extends through the bore and is positioned in the groove to fixedly interconnect the engagement members.

An existing pocket-cutting device disclosed in U.S. Patent Publication No. US20230311360A1 includes a machine bed, a router assembly that is mounted to the machine bed, and a drilling assembly that is mounted to the machine bed. The router assembly routs an object such that the object is formed with a groove. The drilling assembly drills the object such that the object is formed with a bore.

However, an entire configuration of the existing pocket-cutting device and precision of operation of the existing pocket-cutting device may be enhanced.

SUMMARY

Therefore, an object of the disclosure is to provide a pocket hole drilling device that can alleviate at least one of the drawbacks of the prior art.

According to the disclosure, the pocket hole drilling device includes a rack, a front sensing switch, a rear sensing switch, a buffer unit, a rotary frame, a drilling unit, and a routing unit. The front sensing switch is mounted to the rack. The rear sensing switch is mounted to the rack, and is located at one side of the front sensing switch along a front-rear direction. The buffer unit is mounted to the rack. The buffer unit includes a buffer member that is made of a non-rigid material. The rotary frame is rotatably connected to the rack and is rotatable between a first position and a second position. The drilling unit is mounted to the rotary frame. The routing unit is mounted to the rotary frame. The front sensing switch outputs a front limit stop signal when the rotary frame is in the first position. The rear sensing switch outputs a rear limit stop signal when the rotary frame is in the second position. The buffer unit buffers rotation of the rotary frame.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 4 is a fragmentary sectional view taken along line IV-IV in

FIG. 3.

DETAILED DESCRIPTION

Figure 1:
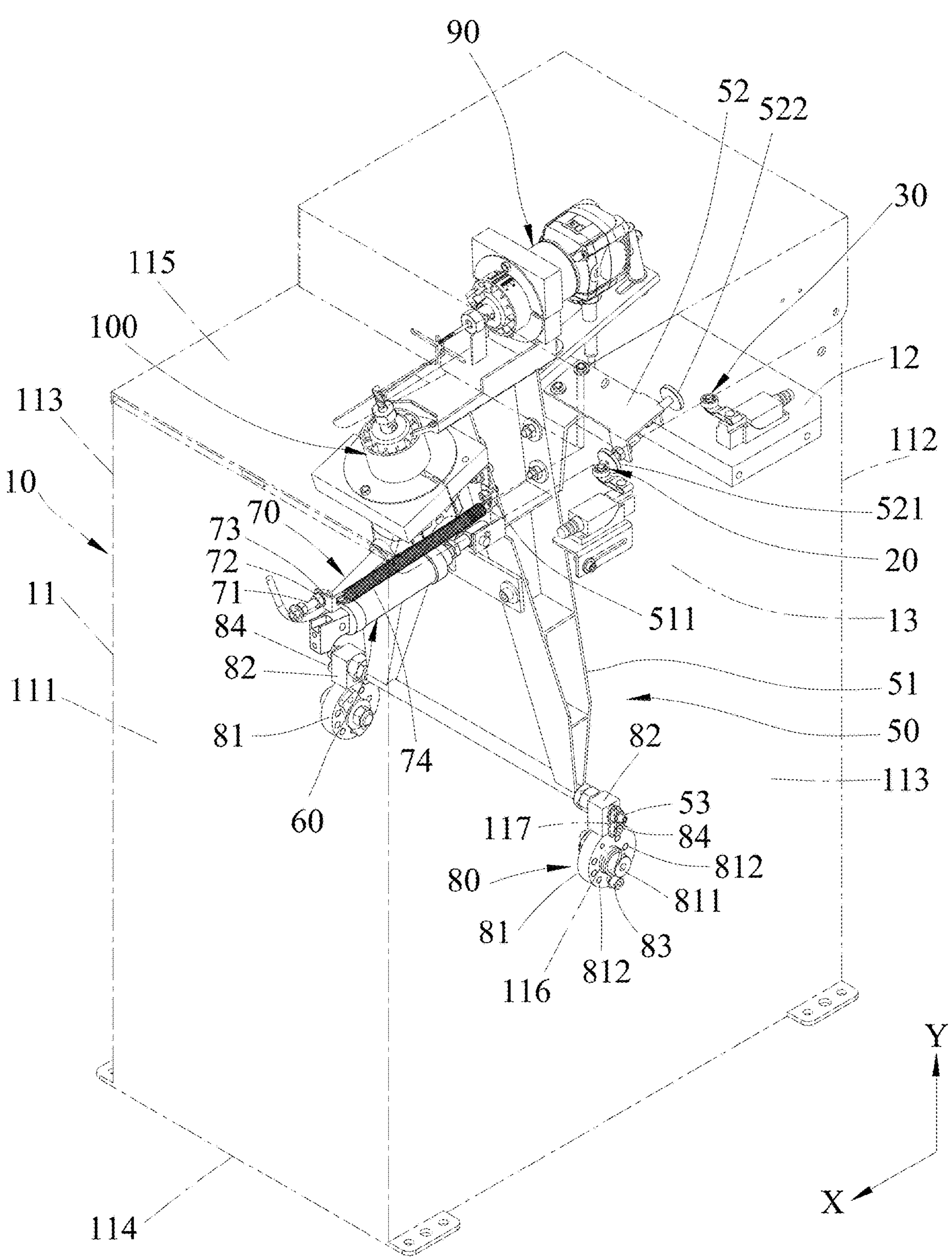
FIG. 1 is a perspective view of an embodiment of a pocket hole drilling device according to the disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
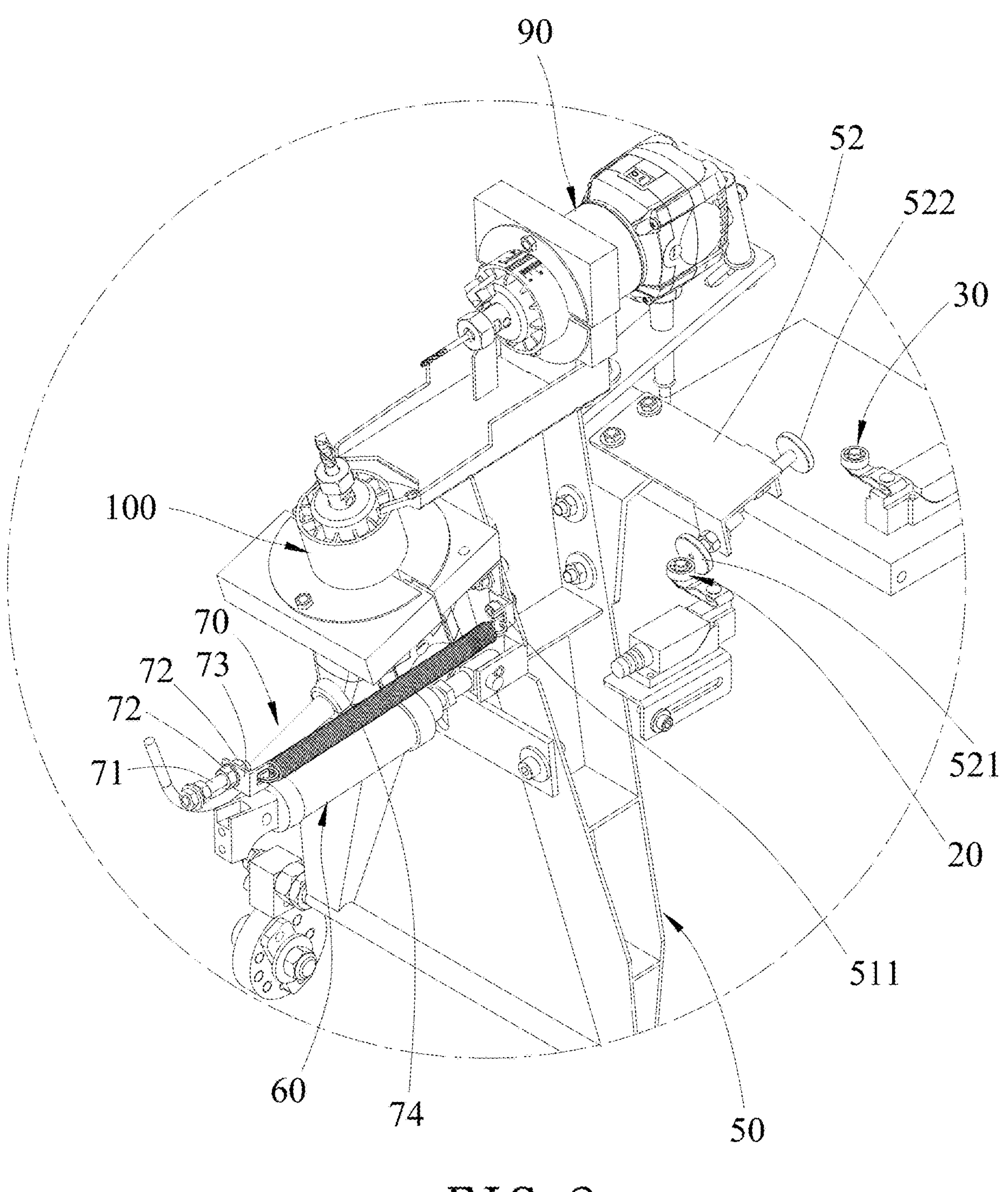
FIG. 2 is an enlarged view of a portion of FIG. 1.
Figure 3:
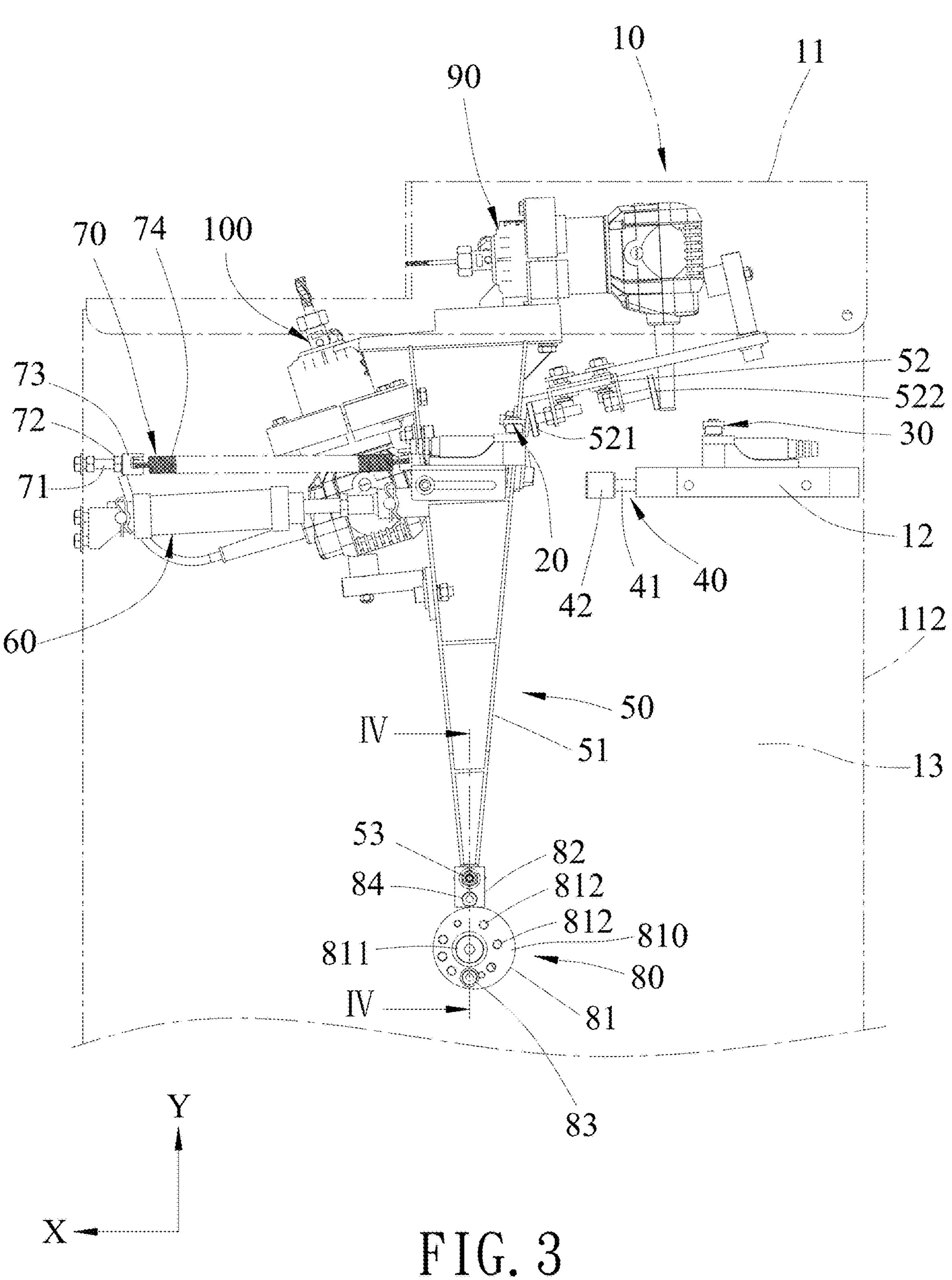
FIG. 3 is a fragmentary side view of the embodiment, illustrating a rotary frame of the embodiment in an initial position.

Referring to FIGS. 1 to 3, an embodiment of a pocket hole drilling device according to the present disclosure includes a rack 10, a front sensing switch 20, a rear sensing switch 30, a buffer unit 40, a rotary frame 50, a driving unit 60, a resilient unit 70, an adjusting unit 80, a drilling unit 90, and a routing unit 100.

The rack 10 includes a case wall 11 that defines an accommodating space 13, and a positioning seat 12 that is fixedly connected to the case wall 11 and that is disposed in the accommodating space 13. The case wall 11 includes a front wall plate 111, a rear wall plate 112 that is spaced apart from the front wall 111 along a front-rear direction (X), two side wall plates 113 each of which is connected to the front wall plate 111 and the rear wall plate 112, a bottom wall plate 114 that is connected to the front wall plate 111, the rear wall plate 112, and the side wall plates 113, and a top wall plate 115 that is spaced apart from the bottom wall plate 114 in a vertical direction (Y) perpendicular to the front-rear direction (X) (i.e., the vertical direction (Y) intersects the front-rear direction (X)). Each of the side wall plates 113 is formed with a rotation hole 116, and an elongated hole 117 that is disposed above the rotation hole 116. Only the rotation hole 116 and the elongated hole 117 of one of the side wall plates 113 are visible in FIG. 1 due to a viewing angle.

The front sensing switch 20 is mounted to one of the side wall plates 113 of the rack 10. The front sensing switch 20 is a micro switch.

The rear sensing switch 30 is mounted to the positioning seat 12 of the rack 10, and is located at one side of the front sensing switch 20 along the front-rear direction (X).

Figure 5:
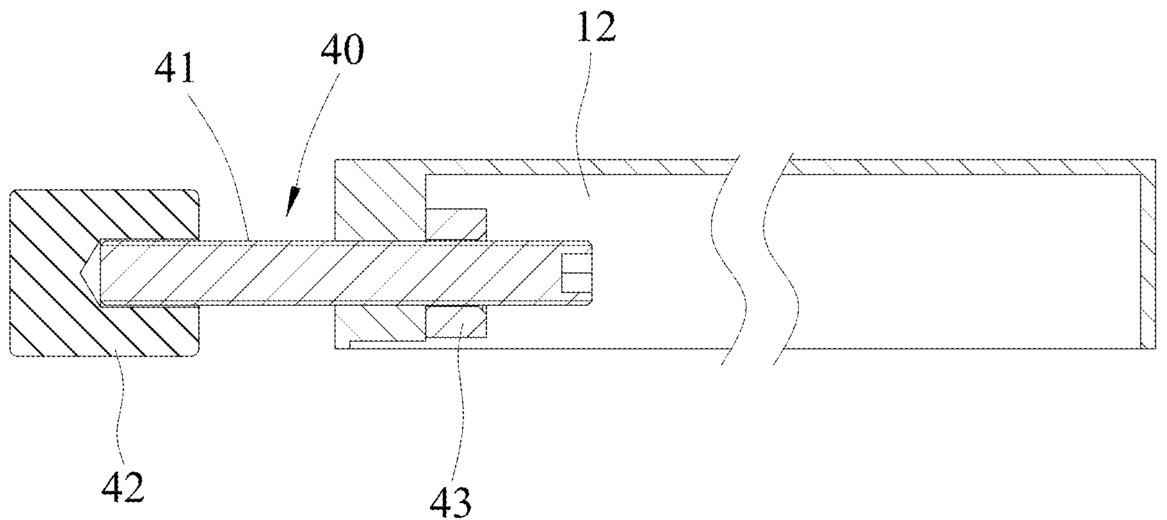
FIG. 5 is a fragmentary sectional view of a buffer unit of the embodiment.

Referring to FIG. 5, the buffer unit 40 is mounted to the positioning seat 12 of the rack 10. The buffer unit 40 includes an adjusting rod 41 that threadedly engages the positioning seat 12, a buffer member 42 that is made of a non-rigid material and that is connected to the adjusting rod 41, and a positioning nut 43 that threadedly engages the adjusting rod 41 and that abuts against the positioning seat 12.

The rotary frame 50 is rotatably connected to the rack 10, and is operable to rotate among an initial position, a first position, and a second position. The rotary frame 50 includes a main frame body 51, a cantilever 52 that is connected to the main frame body 51, and a rotation shaft 53 that is connected to the main frame body 51 and that is rotatably connected to the rack 10. The main frame body 51 includes a rear hook 511. The cantilever 52 includes a front touch member 521 and a rear touch member 522. The rotation shaft 53 extends through the elongated holes 117 of the side wall plates 113, and is movable relative to the rack 10 along the vertical direction (Y). The front touch member 521 corresponds in position to the front sensing switch 20, and is closer to the front sensing switch 20 than the rear touch member 522. The rear touch member 522 corresponds in position to the rear sensing switch 30, and is closer to the rear sensing switch 30 than the front touch member 521.

The driving unit 60 is connected to the rack 10 and the rotary frame 50. The driving unit 60 urges the rotary frame 50 to rotate among the initial position, the first position, and the second position. The driving unit 60 is a pressure cylinder (e.g., a pneumatic cylinder or a hydraulic cylinder).

The resilient unit 70 is connected to the rack 10 and the rotary frame 50. The resilient unit 70 resiliently biases the rotary frame 50 from the second position toward the first position. The resilient unit 70 includes a bolt 71 that is fixedly connected to the rack 10, two clamping nuts 72 that adjustably and threadedly engage the bolt 71, a front hook 73 that is clamped between the clamping nuts 72, and a tension spring 74 that is hooked to the front hook 73 and the rear hook 511 of the rotary frame 50.

Figure 4:
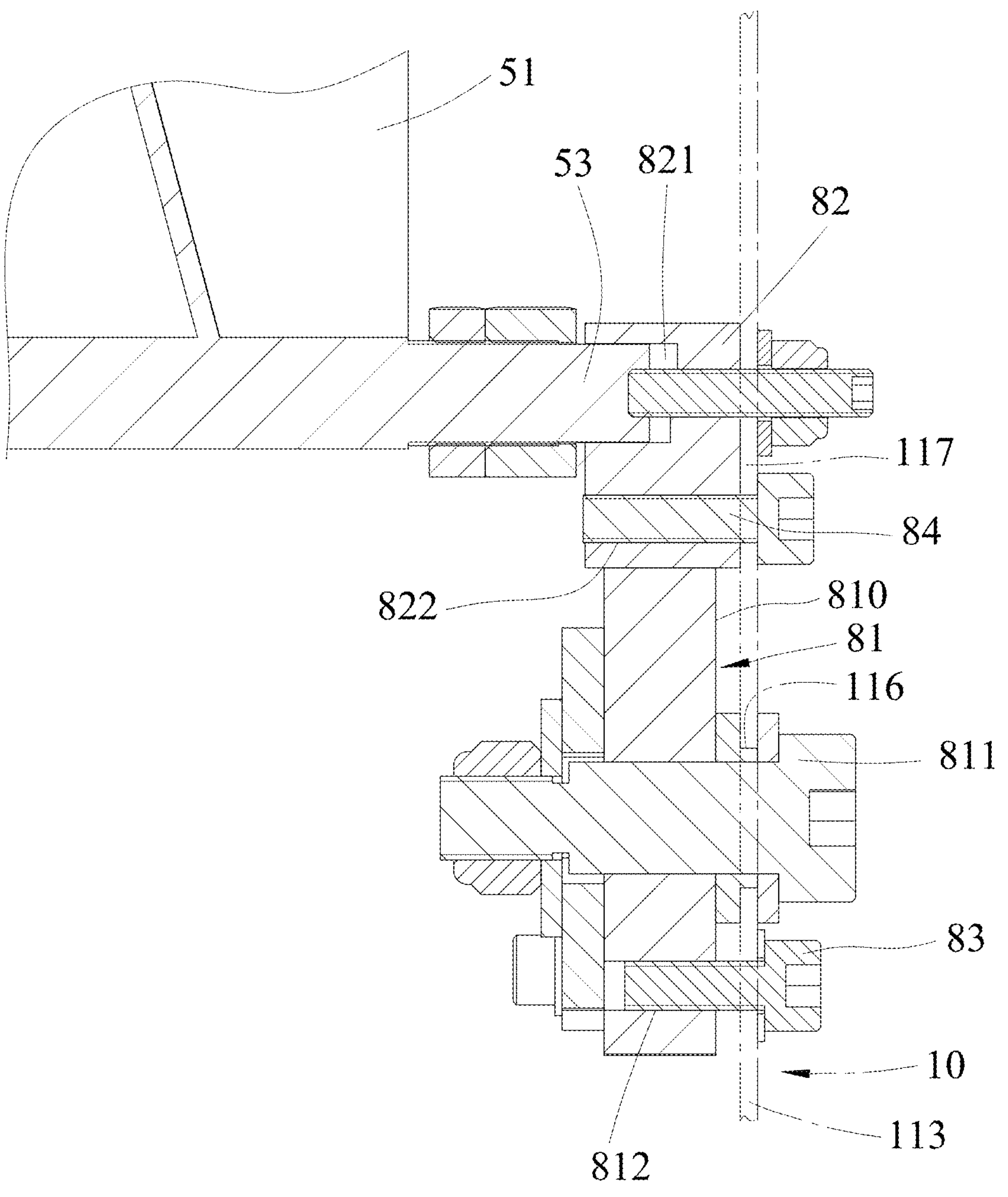

Referring to FIGS. 3 and 4, the adjusting unit 80 is operable to adjust a position of the rotary frame 50 relative to the rack 10 and to position the rotary frame 50. The adjusting unit 80 includes two rotary plates 81 (see FIG. 1) that are axially and rotatably disposed on the rack 10 (i.e., the rotary plates 81 are arranged along an axis and rotatable about the axis), two adjusting blocks 82 that respectively abut against top ends of the rotary plates 81, two locking screws 83 (only one of the locking screws 83 is visible in FIG. 1 due to the viewing angle) that extend through the rack 10 and that respectively and threadedly engage the rotary plates 81, and two fastening screws 84 that extend through the rack 10 and that respectively and threadedly engage the adjusting blocks 82. Each of the rotary plates 81 includes a main plate body 810, a pin shaft 811 that extends through the main plate body 810 and that is axially disposed on the rotation hole 116 of a respective one of the side wall plates 113, and a plurality of adjusting holes 812 that are formed in the main plate body 810 and that surround an outer periphery of the pin shaft 811. In this embodiment, the main plate body 810 of each of the rotary plates 81 is configured to be a circular plate. For each of the rotary plates 81, the pin shaft 811 is deviated from a center of the main plate body 810. Each of the adjusting blocks 82 has a shaft hole 821, and a locking hole 822 that is located at one side of the shaft hole 821. The rotation shaft 53 extends through the shaft holes 821 of the adjusting blocks 82. Each of the locking screws 83 threadedly engages one of the adjusting holes 812 of the respective one of the rotary plates 81. Each of the fastening screws 84 threadedly engages the locking hole 822 of the respective one of the adjusting blocks 82.

The drilling unit 90 is mounted to a top portion of the rotary frame 50.

The routing unit 100 is mounted to a front side of the rotary frame 50.

As shown in FIGS. 1 and 3, when the pocket hole drilling device has been assembled and when the rotary frame 50 is in the initial position, the front touch member 521 does not touch the front sensing switch 20, and the rear touch member 522 does not touch the rear sensing switch 30.

Figure 6:
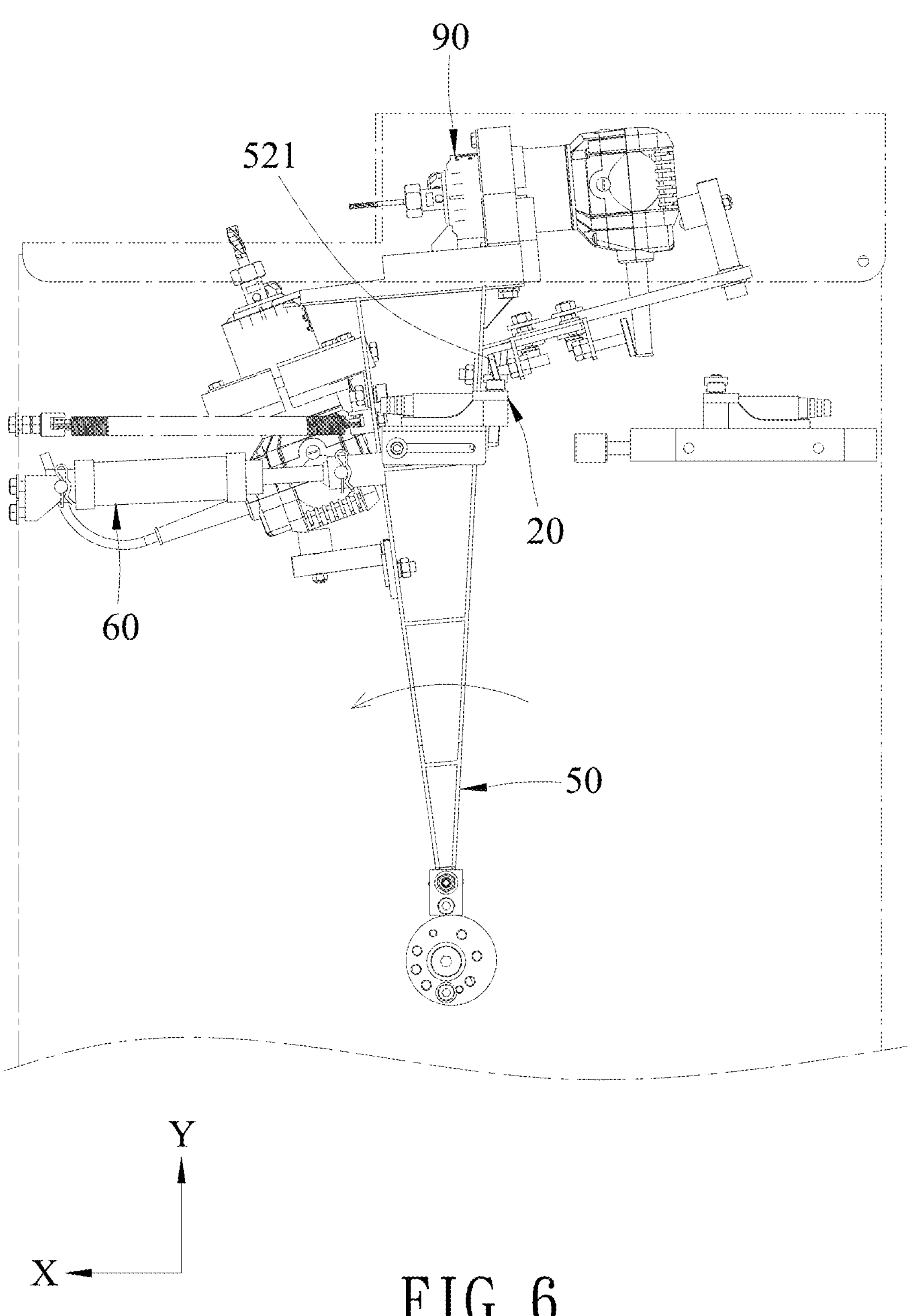
FIG. 6 is another fragmentary side view of the embodiment, illustrating the rotary frame in a first position.

As shown in FIG. 6, when the driving unit 60 is actuated, and when the driving unit 60 drives the rotary frame 50 to rotate in a counterclockwise direction (viewing from FIG. 3 and then to FIG. 6) to the first position, the front touch member 521 touches and actuates the front sensing switch 20 so that the front sensing switch 20 outputs a front limit stop signal and that the driving unit 60 is immediately stopped. The front limit stop signal is connected to the drilling unit 90, and controls the drilling unit 90 to perform a drilling operation.

Figure 7:
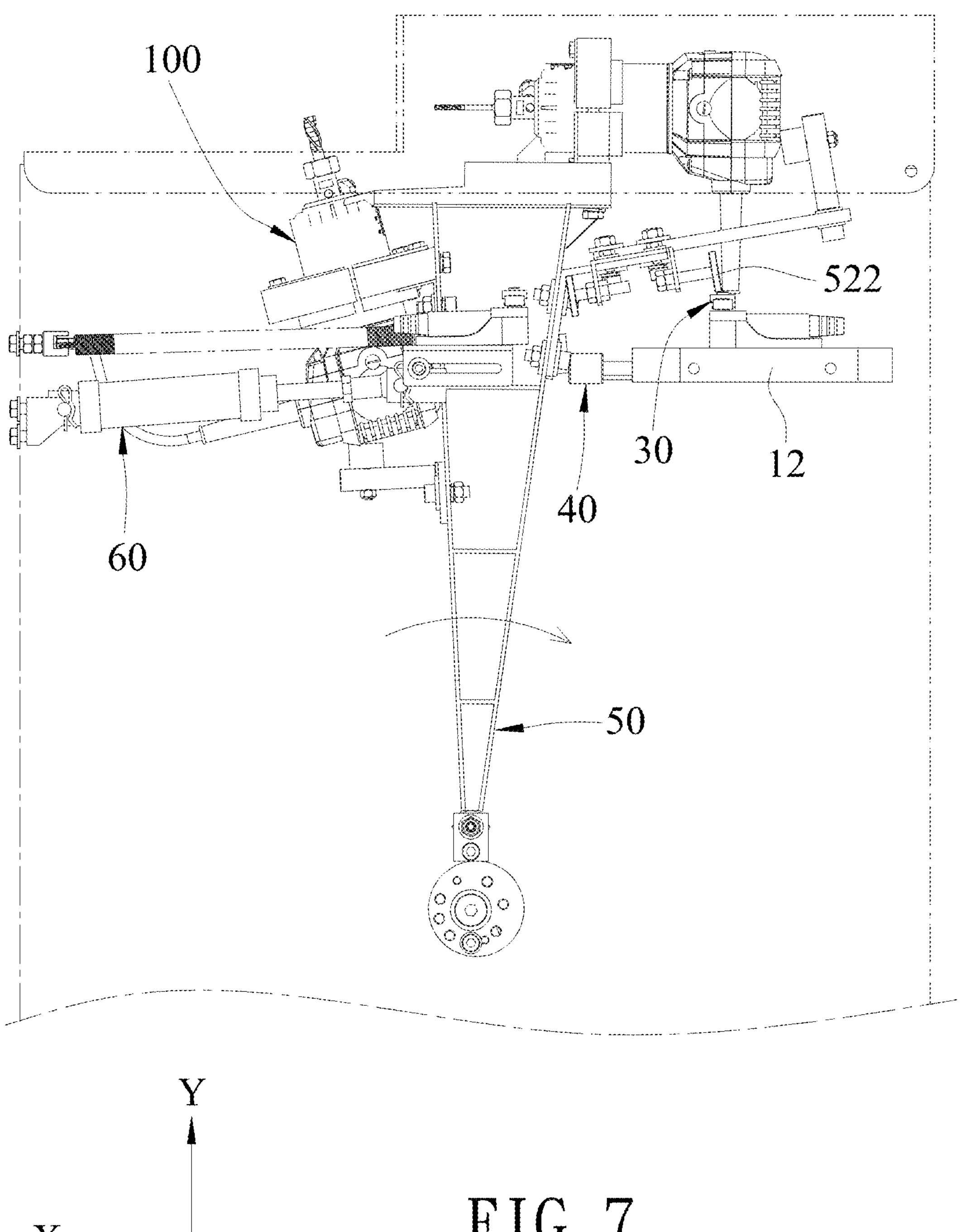
FIG. 7 is still another fragmentary side view of the embodiment, illustrating the rotary frame in a second position.

As shown in FIG. 7, when the driving unit 60 is actuated, and when the driving unit 60 drives the rotary frame 50 to rotate in a clockwise direction (viewing from FIG. 3 and then to FIG. 7) to the second position, the rear touch member 522 touches and actuates the rear sensing switch 30 so that the rear sensing switch 30 outputs a rear limit stop signal and that the driving unit 60 is immediately stopped. The rear limit stop signal is connected to the routing unit 100, and controls the routing unit 100 to perform a routing operation.

In the abovementioned operation, by virtue of the resilient unit 70 being connected to the rack 10 and the rotary frame 50, and by virtue of the resilient unit 70 resiliently biasing the rotary frame 50 from the second position toward the first position, the rotary frame 50 may return to the initial position after the routing operation is completed (i.e., the resilient unit 70 may not resiliently bias the rotary frame 50 toward the first position when the rotary frame 50 is in the initial position).

By virtue of the bolt 71 being fixedly connected to the rack 10, by virtue of the clamping nuts 72 adjustably and threadedly engaging the bolt 71, by virtue of the front hook 73 being clamped between the clamping nuts 72, and by virtue of the tension spring 74 being hooked to the front hook 73 and the rear hook 511, a resilient force provided by the tension spring 74 is adjustable. It is noted that, the rack 10 may further include a main resilient member (not shown) that resiliently biases the rotary frame 50 from the first position to the initial position.

Furthermore, by virtue of the rotary plates 81 being rotatably disposed on the rack 10, by virtue of the adjusting blocks 82 abutting against the top ends of the rotary plates 81, by virtue of the locking screws 83 extending through the rack 10 and respectively and threadedly engaging the rotary plates 81, by virtue of the fastening screws 84 extending through the rack 10 and respectively and threadedly engaging the adjusting blocks 82, and by virtue of the pin shaft 811 of each of the rotary plates 81 being deviated from the center of the main plate body 810 of the rotary plate 81, each of the rotary plates 81 may serve as a disc cam. Thus, when the locking screws 83 and the fastening screws 84 are loosened and when the main plate body 810 of each of the rotary plates 81 is rotated about the pin shaft 811 of the rotary plate 81, the adjusting blocks 82 may urge the rotation shaft 53 of the rotary frame 50 to move relative to the rack 10 along the elongated holes 117 along the vertical direction (Y) such that a height of the rotary frame 50 relative to the rack 10 is adjusted, thereby adjusting a routing depth of the routing operation and a drilling position of the drilling operation. After the adjustment, the locking screws 83 fasten the rotary plates 81 to the rack 10 again and the fastening screws 84 fasten the adjusting blocks 82 to the rack 10 again to ensure that the rotary frame 50 is positioned on the rack 10.

The buffer unit 40 buffers rotation of the rotary frame 50 when the rotary frame 50 rotates in the clockwise direction (viewing from FIG. 3 and then to FIG. 7). That is, when the rotary frame 50 rotates to the second position, the buffer unit 40 buffers an impact generated by the rotation of the rotary frame 50 so that noise may be reduced and that component damage in the pocket hole drilling device may be prevented.

In summary, the pocket hole drilling device according to the present disclosure has a relatively simple structure, is relatively easy to manufacture and to assemble, and may achieve the purpose of precise motion control.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A pocket hole drilling device comprising:

a rack;

a front sensing switch mounted to the rack;

a rear sensing switch mounted to the rack, and located at one side of the front sensing switch along a front-rear direction;

a buffer unit mounted to the rack, the buffer unit including a buffer member that is made of a non-rigid material;

a rotary frame rotatably connected to the rack and rotatable between a first position and a second position;

a drilling unit mounted to the rotary frame; and a routing unit mounted to the rotary frame;

wherein, the front sensing switch outputs a front limit stop signal when the rotary frame is in the first position, the rear sensing switch outputting a rear limit stop signal when the rotary frame is in the second position, the buffer unit buffering rotation of the rotary frame.

2. The pocket hole drilling device as claimed in claim 1, wherein the rotary frame includes a rotation shaft that is rotatably connected to the rack, the rotation shaft being movable relative to the rack along a vertical direction that intersects the front-rear direction, the pocket hole drilling device further comprising an adjusting unit that is operable to adjust a position of the rotary frame relative to the rack and to position the rotary frame.

3. The pocket hole drilling device as claimed in claim 2, wherein the adjusting unit includes two rotary plates that are axially disposed on the rack, two adjusting blocks that respectively abut against top ends of the rotary plates, two locking screws that extend through the rack and that respectively and threadedly engage the rotary plates, and two fastening screws that extend through the rack and that respectively and threadedly engage the adjusting blocks, each of the rotary plates including a main plate body, a pin shaft that extends through the main plate body and that is axially disposed on the rack, and a plurality of adjusting holes that are formed in the plate body and that surround an outer periphery of the pin shaft, for each of the rotary plates, the pin shaft being deviated from a center of the main plate body, each of the locking screws threadedly engaging one of the adjusting holes of the respective one of the rotary plates.

4. The pocket hole drilling device as claimed in claim 1, further comprising a driving unit that is connected to the rack and the rotary frame, the driving unit urging the rotary frame to rotate between the first position and the second position.

5. The pocket hole drilling device as claimed in claim 4, wherein the driving unit is a pressure cylinder.

6. The pocket hole drilling device as claimed in claim 1, further comprising a resilient unit that is connected to the rack and the rotary frame, the resilient unit resiliently biasing the rotary frame toward the first position.

7. The pocket hole drilling device as claimed in claim 6, wherein the resilient unit includes a tension spring.

8. The pocket hole drilling device as claimed in claim 7, wherein the resilient unit further includes a bolt that is fixedly connected to the rack, two clamping nuts that adjustably and threadedly engage the bolt, and a front hook that is clamped between the clamping nuts, the tension spring being hooked to the front hook and the rotary frame.

9. The pocket hole drilling device as claimed in claim 1, wherein the buffer unit buffers the rotation of the rotary frame when the rotary frame rotates to the second position, the buffer unit further including an adjusting rod that threadedly engages the rack, and a positioning nut that threadedly engages the adjusting rod and that abuts against the rack, the buffer member being connected to the adjusting rod.

* * * * *